US012769861B2

(12) United States Patent
Honya et al.

(10) Patent No.: US 12,769,861 B2
(45) Date of Patent: Oct. 20, 2026

(54) VEHICLE CONTROL SYSTEM, ACCESS CONTROL DEVICE, AND ACCESS CONTROL METHOD

(71) Applicant: DENSO CORPORATION, Kariy-city (JP)

(72) Inventors: Hideyuki Honya, Kariya-city (JP); Hideyuki Yamaguchi, Kariya-city (JP); Hironori Yuno, Kariya-city (JP); Satoshi Niwa, Kariya-city (JP)

(73) Assignee: DENSO CORPORATION, Kariya-city (JP)

(*) Notice: Subject to any disclaimer, the term of this patent is extended or adjusted under 35 U.S.C. 154(b) by 104 days.

(21) Appl. No.: 18/810,668

(22) Filed: Aug. 21, 2024

(65) Prior Publication Data

US 2024/0411915 A1 Dec. 12, 2024

Related U.S. Application Data

(63) Continuation of application No. PCT/JP2023/013942, filed on Apr. 4, 2023.

(30) Foreign Application Priority Data

Apr. 7, 2022 (JP) ................................ 2022-064078

(51) Int. Cl.

*G06F 21/62* (2013.01)
*B60R 16/023* (2006.01)

(52) U.S. Cl.

CPC ...... *G06F 21/6218* (2013.01); *B60R 16/0231* (2013.01)

(58) Field of Classification Search

None

See application file for complete search history.

(56) References Cited

U.S. PATENT DOCUMENTS

2018/0075231 A1 3/2018 Subramanian et al.
2018/0077144 A1 3/2018 Gangawane et al.
2020/0211301 A1* 7/2020 Zhang .................. H04L 63/065

FOREIGN PATENT DOCUMENTS

JP 6124627 B2 5/2017
JP 6960450 B2 11/2021

* cited by examiner

*Primary Examiner* — Brandon Hoffman

(74) *Attorney, Agent, or Firm* — Harness, Dickey & Pierce, P.L.C.

(57) ABSTRACT

A vehicle control system, an access control device or an access device control method determines whether to authorize access from a request source block to a request destination interface according to an authorization policy in response to an access request to the request destination interface, and transmits the access request to the request destination interface when access is authorized. The authorization policy is set using a provision level and a request level.

9 Claims, 12 Drawing Sheets

FIG. 4

○ : ACCESSIBLE
× : NOT ACCESSIBLE

| | | PROVISION LEVEL OF SW-C | | | | |
|---|---|---|---|---|---|---|
| | | QM | A | B | C | D |
| REQUEST LEVEL OF API | QM | ○ | ○ | ○ | ○ | ○ |
| | A | × | ○ | ○ | ○ | ○ |
| | B | × | × | ○ | ○ | ○ |
| | C | × | × | × | ○ | ○ |
| | D | × | × | × | × | ○ |

FIG. 6

| | | CONTROL SYSTEM FUNCTIONAL BLOCK GROUP: DECELERATION API | |
|---|---|---|---|
| | | HIGH-SPEED RANGE | LOW-SPEED RANGE |
| SERVICE SYSTEM FUNCTIONAL BLOCK | F1 | ○ | ○ |
| | F2 | × | ○ |

FIG. 12

○ : ACCESSIBLE
× : NOT ACCESSIBLE

| | | PROVISION LEVEL OF EACH SW-C | | |
|---|---|---|---|---|
| | | SW-C_001 | SW-C_002 | SW-C_003 |
| | | A | B | D |
| REQUEST LEVEL OF EACH API | API_001 B | × | ○ | ○ |
| | API_002 QM | ○ | ○ | ○ |
| | API_003 C | × | × | ○ |

VEHICLE CONTROL SYSTEM, ACCESS CONTROL DEVICE, AND ACCESS CONTROL METHOD

CROSS REFERENCE TO RELATED APPLICATIONS

The present application is a continuation application of International Patent Application No. PCT/JP2023/013942 filed on Apr. 4, 2023, which designated the U.S. and claims the benefit of priority from Japanese Patent Application No. 2022-064078 filed on Apr. 7, 2022. The entire disclosures of all of the above applications are incorporated herein by reference.

TECHNICAL FIELD

The present disclosure relates to a technology for protecting vehicle functions.

BACKGROUND

In a comparative example, a technology is described for determining whether access is permitted by referring to an access policy when access to user resources is detected from an application on an open platform for a portable terminal.

SUMMARY

A vehicle control system, an access control device or an access device control method determines whether to authorize access from a request source block to a request destination interface according to an authorization policy in response to an access request to the request destination interface, and transmits the access request to the request destination interface when access is authorized. The authorization policy is set using a provision level and a request level.

BRIEF DESCRIPTION OF THE DRAWINGS

FIG. 4 is a table illustrating the contents of an authorization policy.

FIG. 6 is a table showing an authorization policy image resulting from determining access permission from SW-C to API in the example shown in FIG. 5.

FIG. 12 is a table illustrating the contents of a correspondence table.

DETAILED DESCRIPTION

Figure 1:
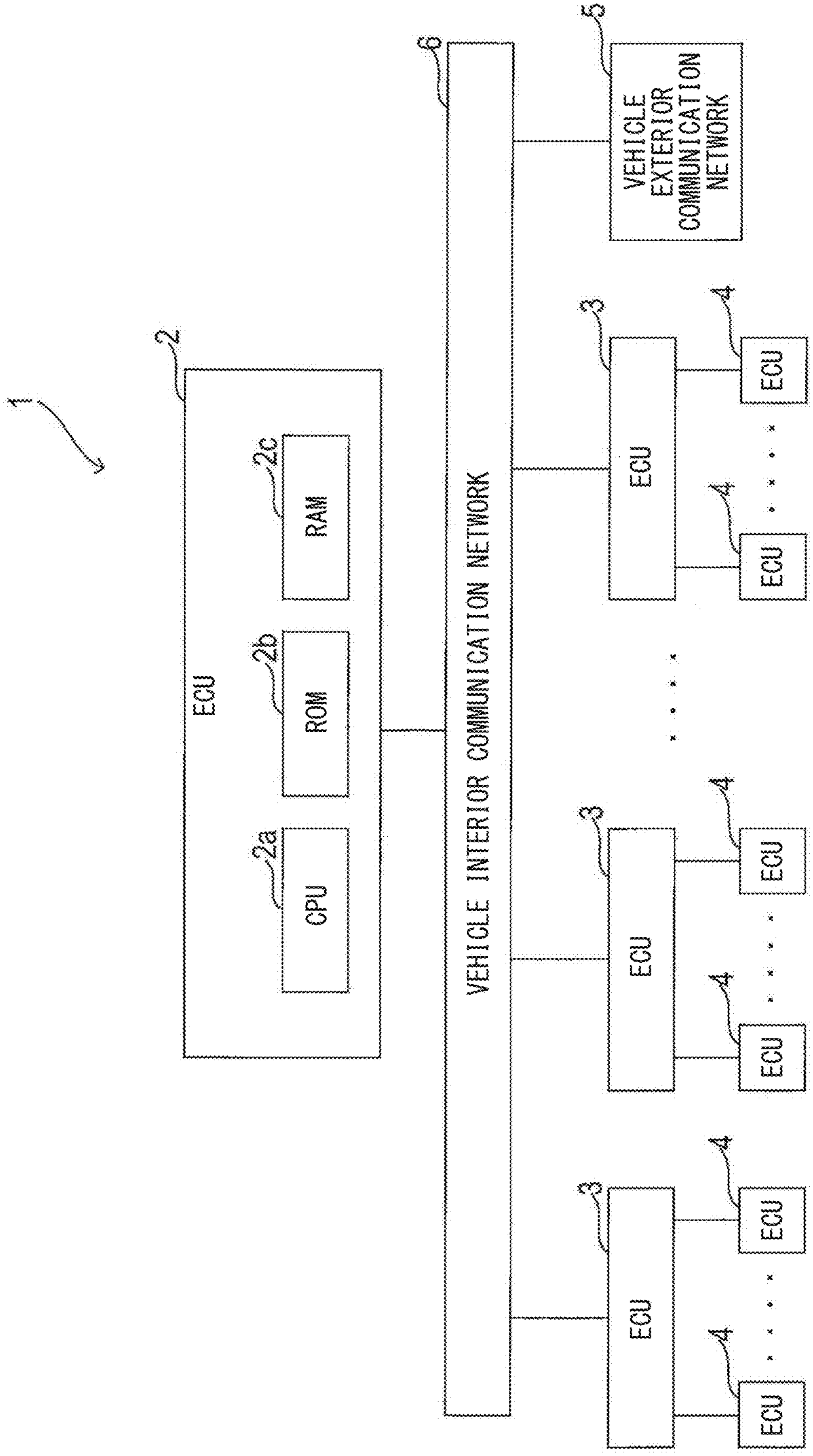
FIG. 1 is a block diagram showing a vehicle control system.

By the way, platforms using API are being used in vehicle control systems. The API is an interface prepared to provide the functions of a vehicle, and the application implemented on the platform uses API to implement various functions.

Platforms applied to vehicle control systems are required to ensure real-time performance while implementing the function with limited resources. Therefore, the access policy used to determine whether an individual API has access rights is set, for example, on an application basis.

In this situation, even in a case where the access request dynamically generated during execution of the application contains inappropriate control contents, when it is an access request from the authorized application, the API accepts the access request and executes the process. In other words, API could not exclude improper access requests from authorized applications. The inappropriate access request is, for example, a request for vehicle control that causes an acceleration exceeding an acceptable range to the API that provides a function to control the acceleration of the vehicle.

Furthermore, in the future, if third-party applications are introduced, there is a possibility that unexpected inappropriate access requests caused by lack of knowledge of the application creators may increase.

One example of the present disclosure provides a technology that restricts inappropriate access requests to APIs in a vehicle control system.

According to one example embodiment of the present disclosure, a vehicle control system includes a plurality of electronic control units mounted on a vehicle and connected to an in-vehicle network. The plurality of electronic control units include a plurality of functional blocks and a coordination controller.

The plurality of functional blocks are each configured to execute a predetermined process and at least in part configured to provide a function for controlling motion of a vehicle; and The coordination controller is configured to implement coordination between the plurality of functional blocks.

At least a part of the plurality of functional blocks includes a functional interface. A functional interface is an interface configured to provide its own function to a different functional block.

The coordination controller includes a policy storage and an access controller.

A policy storage is configured to store an authorization policy indicating a rule for authorizing access of an access request from one of the plurality of functional blocks to one of the plurality of functional interfaces.

When the access controller accepts an access request from at least one of the plurality of functional blocks, it determines whether to authorize access from a request source block to a request destination interface according to the authorization policy. The request source block is a functional block from which an access request is requested. The request destination interface is a functional interface and is the request destination of the access. The access controller is configured to transmit the access request to the request destination interface when the access is authorized. The authorization policy is set using a provision level and a request level, the provision level is a safety level indicating safety of the function guaranteed by the request source block, and the request level is the safety level requested by the request destination interface to the request source block.

According to such a configuration, only the access request from the functional block satisfying the request level of the function interface can be transmitted to the functional interface which is the access destination. Accordingly, it is possible to prevent unexpected control by freely using the functional interface that provides safety-related functions by functional blocks with the low reliability or the like. In addition, since the functions provided by functional interface do not need to include processes to deal with requests from functional blocks that do not meet the request level, it is possible to simplify the processes.

The access controller in one aspect of the present disclosure includes the plurality of functional blocks described above and a cooperating controller.

According to the access control device, the same effect as the vehicle control system can be obtained.

An access control method according to one example embodiment of the present disclosure determines whether to authorize access from a request source block to a request destination interface for an access request from at least one of the plurality of functional blocks according to an authorization policy, and transmits the access request to the request destination interface when the access is authorized. The authorization policy is set using a provision level and a request level, the provision level is a safety level indicating safety of the function provided by the request source block, and the request level is the safety level requested by the request destination interface to the request source block.

The plurality of functional blocks are each configured to execute a predetermined process. A functional interface is an interface provided by at least a portion of a plurality of functional blocks to provide functions that it has for other functional blocks. The authorization policy indicates rules for authorizing access to functional interfaces for access requests. The request source block is a functional block from which an access request is requested. The request destination interface is a functional interface and is the request destination of the access request.

According to the access control system, the same effect as the access control device can be obtained.

Hereinafter, an embodiment of the present disclosure will be described with reference to drawings.

1. Configuration

Hereinafter, a first embodiment according to the present disclosure will be described with reference to the drawings.

A vehicle control system 1 of the present embodiment is mounted on a vehicle. The vehicle may have an automated driving function in addition to a manual driving function. The vehicle may be a hybrid vehicle having an engine and an electric motor as a traveling source. The vehicle is not limited to the vehicle having the automated driving function or the hybrid vehicle, but may be a vehicle having only a manual driving function, or a vehicle having only an engine or only an electric motor as the traveling source. Hereinafter, the vehicle equipped with the vehicle control system 1 will be simply referred to as a vehicle.

As shown in FIG. 1, the vehicle control system 1 includes one ECU 2, multiple ECUs 3, multiple ECUs 4, a vehicle exterior communication device 5, and a vehicle interior communication network 6. The ECU is an abbreviation for electronic control unit.

The ECU 2 controls the plurality of ECUs 3 to achieve coordinated control of the entire vehicle.

The ECU 3 is provided for each domain divided by function in the vehicle, and mainly controls a plurality of ECUs 4 existing within that domain. Each ECU 3 is connected to the ECU 4 under the control thereof via an individually provided lower layer network (for example, CAN). The CAN is a registered trademark and is an abbreviation for Controller Area Network. The ECU 3 has a function of centrally managing access authority of the ECU 4 under the control thereof and authenticating users. The domain includes, for example, a powertrain, a body, a chassis, a cockpit, and the like.

The ECUs 4 connected to the ECU 3 belonging to the powertrain domain include, for example, an ECU 4 that controls the engine, an ECU 4 that controls the motor, and an ECU 4 that controls the battery.

The ECUs 4 connected to the ECU 3 belonging to the body domain include, for example, an ECU 4 that controls the air conditioner and an ECU 4 that controls the doors.

The ECUs 4 connected to the ECU 3 belonging to the chassis domain include, for example, an ECU 4 that controls the brakes and an ECU 4 that controls the steering.

The ECUs 4 connected to the ECU 3 belonging to the cockpit domain include, for example, an ECU 4 that controls the display of meters and navigation, and an ECU 4 that controls input devices operated by vehicle occupants.

The vehicle exterior communication unit 5 conducts data communication with communication devices outside the vehicle (e.g., cloud servers) via a wide-area wireless communication network.

Figure 2:
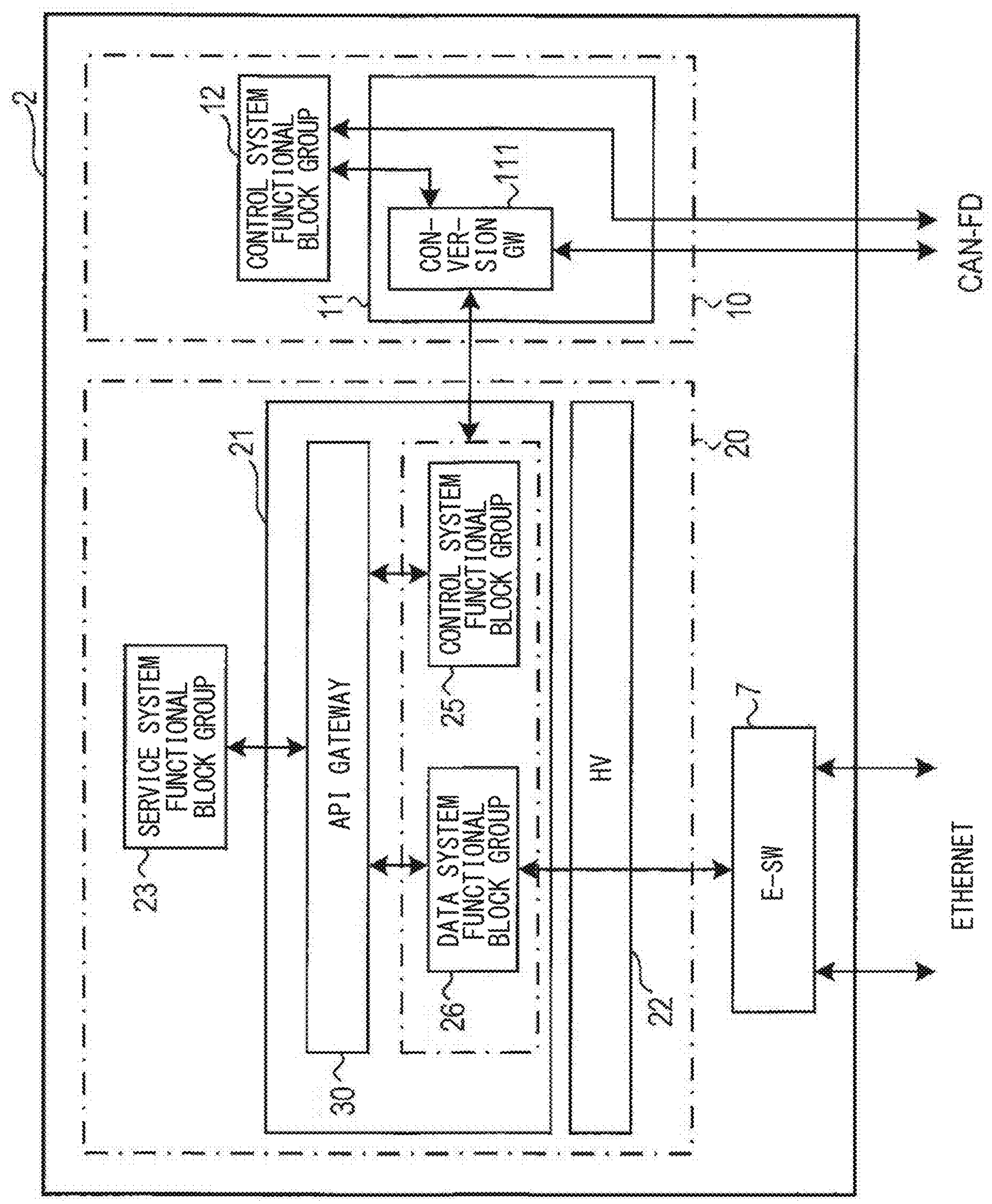
FIG. 2 is a block diagram showing the configuration of an ECU.

The vehicle interior communication network 6 includes CAN FD and Ethernet. The Ethernet is a registered trademark. The CAN FD is an abbreviation for CAN with Flexible Data Rate. The CAN FD connects ECU 2 to each ECU 3 and the vehicle exterior communication device 5 via a bus. The Ethernet connects ECU 2 and each ECU 3 and the vehicle exterior communication device 5 individually. The ECU 2 is provided with an Ethernet switch 7 for switching the Ethernet to be used, as shown in FIG. 2.

The ECU 2 is an electronic control unit mainly including a microcomputer including a CPU 2*a*, a ROM 2*b*, a RAM 2*c*, and the like. Various functions of the microcomputer are implemented by the CPU 2*a* executing programs stored in a non-transitory tangible storage medium. In this example, the ROM 2*b* corresponds to a non-transitory tangible storage medium that stores a program. Further, by executing this program, a method corresponding to the program is executed. Some or all of the functions executed by the CPU 2*a* may be configured in hardware using one or more ICs. Further, the number of the microcomputers constituting the ECU 2 may be one or more.

The ECU 3, the ECU 4, and the vehicle exterior communication device 5 are all electronic control units mainly including a microcomputer provided with a CPU, ROM, RAM, and the like, similarly to the ECU 2. Further, the number of the microcomputers constituting the ECU 3 and ECU 4, and the vehicle exterior communication device 5 may be one or more. The ECU 3 is an ECU that controls one or more ECUs 4, and the ECU 2 is an ECU that controls one or more ECUs 3 or controls the ECUs 3 and 4 of the entire vehicle including the vehicle exterior communication device 5.

Hereinafter, unless otherwise specified, the ECU 2, ECU 3, ECU 4, and the vehicle exterior communication device 5 will be collectively referred to as in-vehicle devices 2 to 5.

The ECU 2 has a real-time processing unit 10 and an application processing unit 20. When the ECU 2 includes multiple CPUs 2*a*, the real-time processing unit 10 and the application processing unit 20 may be implemented by processes executed by the same CPU or by processes executed by different CPUs.

The real-time processing unit 10 executes vehicle control and other operations that require real-time performance in cooperation with in-vehicle devices 3 to 5 connected via the CAN FD. The application processing unit 20 executes various applications that require high processing capabilities (for example, entertainment applications) in cooperation with in-vehicle devices 3 to 5 connected via the Ethernet.

The application processing unit 20 has a function to transmit instructions based on the processes of various applications to the real-time processing unit 10. The real-time processing unit 10 has a function to transmit information, and the like collected from the ECU and the like, to the application processing unit 20 via the CAN FD. The real-time processing unit 10 and the application processing unit 20 cooperate with each other to implement various functions.

2. Functional Configuration

The software of the vehicle control system 1 is built along AUTOSAR. The AUTOSAR is an abbreviation for Automotive Open System Architecture. The AUTOSAR provides not only communication between software components (hereinafter referred to as SW-C) provided to implement various applications, but also functions related to connection to the cloud, security, and the like. The SW-C is parted software to implement a certain function. The application program includes one or more SW-C. Note that the software of the vehicle control system 1 does not necessarily need to be built along AUTOSAR.

Each device belonging to the vehicle control system 1, that is, the ECU 2, the ECU 3, the ECU 4, and the vehicle exterior communication device 5, are all provided with a platform. The platform provides an environment for running SW-C written in a hardware-independent format.

The platform includes a runtime environment (hereinafter, RTE) and underlying software (hereinafter, BSW). The RTE is the interface between SW-C and between SW-C and BSW. The BSW is the hierarchy connecting hardware and SW-C, including OS, driver, middleware, etc. The functions of the BSW are divided into small modules and the functions of each module are provided to the SW-C via API. The API is an abbreviation for Application Programming Interface.

Hereinafter, the platform provided in the real-time processing unit 10 is referred to as a first platform (hereinafter, first PF) 11, and the platform provided in the application processing unit 20 is referred to as a second platform (hereinafter, second PF) 21.

As shown in FIG. 2, the real-time processing unit 10 is provided with a control system functional block group 12 as a collection of service applications (hereinafter referred to as service applications) operating on the first PF 11. A service application is an application that receives requests from clients, processes them, and returns results.

The control system functional block group 12 is a group of applications for providing an API for accepting instructions related to the movement of the vehicle and for controlling the instructions accepted by the API to implement consistent vehicle control. The control system functional block group 12 outputs various instructions via the vehicle interior communication network 6 to the in-vehicle devices 3 to 5 in which there is an embodiment that executes control based on the directive.

The first PF 11 is provided with a conversion gateway 111. The conversion gateway 111 has a function to convert the communication frame received by the real-time processing unit 10 via the CAN FD into Ethernet format and provides it to the application processing unit 20. In addition, the conversion gateway 111 has a function to convert the communication frame in the Ethernet format provided by the application processing unit 20 to the CAN format.

The application processing unit 20 includes a hypervisor 22, and executes software on a plurality of virtual machines. Note that the hypervisor 22 may be omitted.

The application processing unit 20 includes a service system functional block group 23 as a collection of service applications operating on the second PF 21.

The service system functional block group 23 is a collection of service applications. Each service application shall have one or more SW-C. The service applications are provided by third parties as well as the vehicle manufacturer who manufactured the vehicle. The third party that provides service applications includes, for example, data utilization companies that provide services by collecting data from vehicles.

The second PF 21 includes a control system functional block group 25, a data system functional block group 26, and an API gateway 30.

The control system functional block group 25 is a set of programs equipped with an API for accepting requests related to vehicle control from the service system functional block group 23. The control system functional block group 25 converts the API access request that is expressed in a vehicle-independent format and from the service system functional block group 23 into an API access request expressed in a vehicle-dependent format and provides it to the real-time processing unit 10. The API provided by the control system functional block group 25 includes a motion system API for controlling motion of the vehicle and a non-motion system API other than the motion system API. The API access request accepted by the motion system API is transferred to the control system functional block group 12, and is transferred from the control system functional block group 12 to the in-vehicle devices 3 to 5 which execute control based on the request via the vehicle interior communication network 6. The API access request accepted by the non-motion system API is transferred to the in-vehicle devices 3 to 5 which execute control based on the request via the vehicle interior communication network 6.

The data system functional block group 26 is a set of programs equipped with an API for handling vehicle data acquired and stored via the real-time processing unit 10. The data system functional block group 26 has a function of abstracting and storing vehicle data expressed in a vehicle-dependent format supplied from the real-time processing unit 10 into a vehicle-independent format. The data system functional block group 26 may have an API that provides a function to transmit designated vehicle data to the ECU or the like via the Ethernet. In particular, when the destination is the vehicle exterior communication device 5, the vehicle exterior communication device 5 may upload the transmitted vehicle data to the cloud.

It should be noted that communication with other in-vehicle devices 3 to 5 via the control system functional block group 25 is not limited to the CAN FD, but Ethernet or other communication means may be used. In addition, communication with other in-vehicle devices 3 to 5 via the data system functional block group 26 may be performed not only by Ethernet, but also by the CAN FD or other communication means.

The API gateway 30 is configured by utilizing the functions of the virtual function bus (hereinafter referred to as VFB). The VFB is middleware that enables communication between SW-C and between SW-C and BSW without awareness of hardware or communication protocol, also called software bus. Communication between SW-Cs is access to API provided by other SW-C from SW-C. Communication between SW-C and BSW is access to API provided by control system functional block group 25 and data system functional block group 26 from SW-C.

That is, the SW-Cs access various APIs via the API gateway 30 and use the functions provided by the accessed APIs to implement desired functions.

The SW-C transmits an API access request when using the API. The API access request includes at least the process ID of the SW-C from which the request is made and the API-ID, the information indicating the API to which the request is made.

3. Access Restriction Mechanism

An access restriction mechanism will be described. In the access restriction mechanism, the API gateway 30 restricts access to the API from the SW-C. The access restriction mechanism is set from the viewpoint of ensuring safety so that there is no risk to the occupants of the vehicle by executing a service application with a low safety standard, among the service applications belonging to the service system functional block group 23.

The API gateway 30 is not only provided in the second PF 21 operating on the application processing unit 20, but also in the platforms of all in-vehicle devices 2 to 5 that may include any of the service system functional block group 23, the control system functional block group 25, and the data system functional block group 26.

Figure 3:
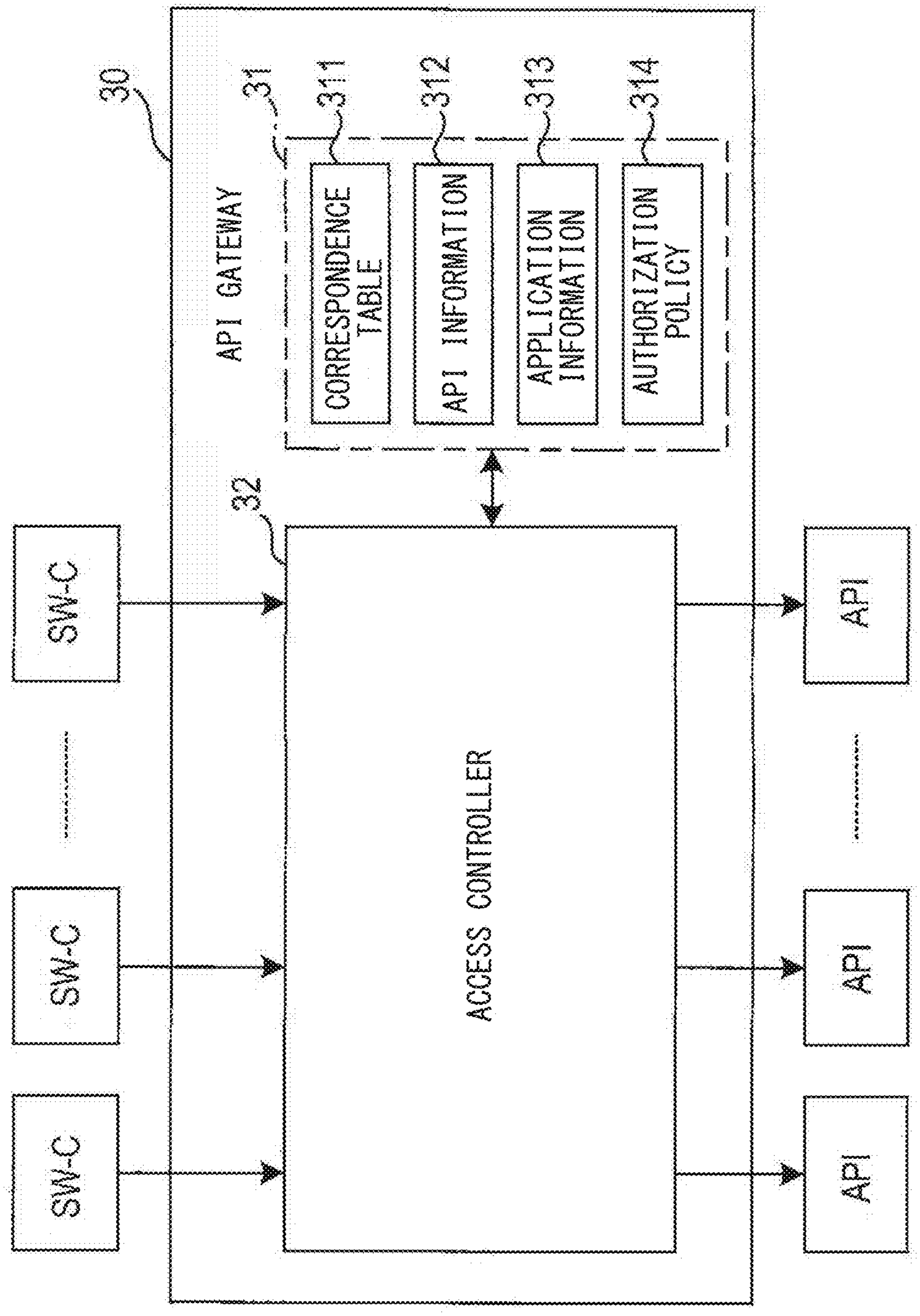
FIG. 3 is a block diagram showing the configuration of an API gateway.

As shown in FIG. 3, the API gateway 30 includes an information storage 31 and an access controller 32.

The information storage 31 stores a correspondence table 311, API information 312, application information 313, and authorization policy 314. The correspondence table 311 is stored in the RAM 2*c*, and the API information 312, the application information 313, and the authorization policy 314 are stored in the ROM 2*b*. However, the API information 312, the application information 313, and the authorization policy 314 may be stored in the nonvolatile RAM 2*c*.

The correspondence table 311 is information that correlates the process ID dynamically assigned to the process that is the execution unit of the program in the operating system (hereinafter referred to as the OS) with the unique application ID possessed by SW-C executed in the process. In addition, the correspondence table 311 is information that correlates the unique API-ID possessed by the individual API with the process ID of the process executing SW-C of the embodied executing the API. The correspondence table 311 is generated by the OS when a process for each SW-C is generated when the system starts. The correspondence table 311 is stored in the RAM 2*c*.

The API information 312 indicates information about the API identified by the API-ID. In particular, the API information 312 about the API (hereinafter referred to as a safety system API) that provides the function related to safety includes the safety level (hereinafter referred to as a request level) requested for the SW-C from which the API access request is made. The safety system API includes, for example, an API that provides a function to control an actuator related to motion of a vehicle (e.g., front-rear acceleration and steering), an API that provides a function to control illumination of a light, and the like.

The application information 313 indicates information about the SW-C identified by the application ID. In particular, the application information 313 about the SW-C (hereinafter referred to as a safety system SW-C) that executes the process related to safety includes the safety level (hereinafter referred to as a provision level) that represents the reliability degree about the safety of the process executed by the SW-C. When the SW-C includes an additional API, the application information 313 includes the request level of the additional API. The additional API is an API prepared by the SW-C to provide its own functions to other SW-Cs.

The safety level shall be, for example, the Automotive Safety Integrity Level (hereinafter referred to as ASIL). The ASIL is a risk classification system defined by the ISO 26262 standard for functional safety of vehicles on the road. The ASIL is determined by three parameters: probability of exposure, controllability, and severity, and is expressed on a scale of A to D. The A is the lowest level, and the D is the highest level. The request level of the non-safety system API is expressed in QM. In other words, the safety level is essentially expressed on a scale of QM, A to D, with QM being the lowest level. The safety level does not necessarily need to use the ASIL, but should be a safety level defined to have multiple levels. Therefore, the safety level also need not to be four levels of A to D, but three levels or less or five levels or more.

As shown in FIG. 4, the authorization policy 314 is expressed by a matrix representing all combinations of the provision level of the SW-C and the request level of the API, and represents whether the SW-C can access the API. The provision level of the SW-C represents the safety level of the caller. The request level of the API represents the safety level of the calling destination. In the figure, the circle indicates that the access is possible, and the cross mark indicates that the access is not possible. Here, it is set to be accessible when the provision level is equal to or higher than the request level, and to be inaccessible when the provision level is lower than the request level. For example, all access requests to API with a request level of QM will be accessible regardless of the level provided by the requesting SW-C. Further, the access request to the API whose request level is C becomes accessible when the provision level of the request source SW-C is C, D. The access request becomes inaccessible when the provision level of the request source SW-C is QM, A, or B.

The authorization policy 314 shown in FIG. 4 is a table showing universal policies applied to all SW-Cs and all APIs. In contrast, a table (hereinafter referred to as the correspondence table) indicating a policy adapted to an individual vehicle may be used. The correspondence table is generated by combining information of the authorization policy 314 and the correspondence table 311, may be used.

As shown in FIG. 12, in the correspondence table, the provision level of each SW-C actually operating on the second PF 21 is listed instead of the provision level that SW-C can take. Each SW-C provision level may be associated with a process ID corresponding to the SW-C. In addition, in the adaptive authorization policy, instead of the request level that can be obtained by the API, the request level of each API actually prepared in the second PF 21 is listed. The request level of each API may be associated with a process ID corresponding to the API.

In other words, in the correspondence table, the availability of access to each API from each SW-C is expressed by a matrix representing all combinations of one or more SW-Cs each having the provision level and one or more APIs each having the request level. In accordance with the contents of the authorization policy 314, the access is set to be permitted when the provision level is equal to or higher than the request level, and to be not permitted when the provision level is lower than the request level.

Although the above correspondence table has a built-in determination result of whether access is permitted by an authorization policy 341 in advance, the correspondence table may indicate only the correspondence between each SW-C and the provision level and the correspondence between each API and the request level. In this case, based on the SW-C of the request source extracted from the access request and the API of the request destination, the provision level of SW-C and the request level of the API are extracted by referring to the correspondence table. Then, based on the extracted provision level and the request level, it is determined whether the SW-C of the request source can access the API of the request destination in accordance with the authorization policy 341. That is, for each occurrence of the access request, whether the access is possible may be determined using the authorization policy 314.

In addition, the number of SW-C operating on the second PF 21 and the number of APIs provided by the second PF may increase or decrease, and the definition of the provision level and the request level may change. Accordingly, the authorization policy 314 and the correspondence table may be updated each time the software is updated.

The SW-C with the provision level is designed to satisfy the provision level. The provision level of the SW-C and the request level of API of the SW-C may be the same or different.

The access controller 32 accepts an API access request from the SW-C indicating a process ID indicating a request source and an API-ID indicating an access destination. The access controller 32 accepts not only the API access request from SW-C belonging to the service system functional block group 23, but also all the API access requests from the SW-C operating on the platform equipped with the API gateway 30.

Figure 11:
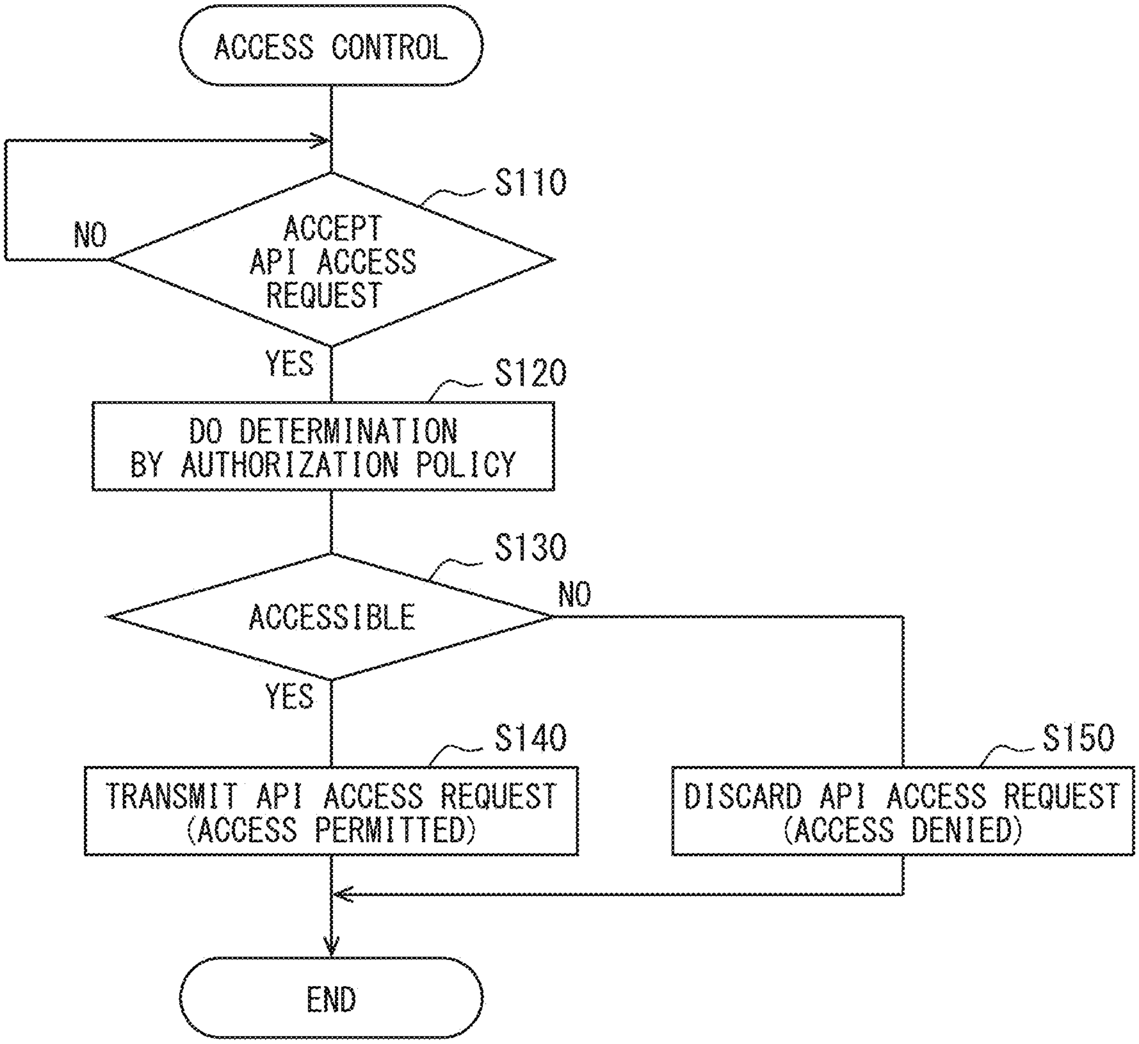
FIG. 11 is a flowchart of the process executed by the access controller.

The processes executed by the access controller 32 will be described using the flowchart in FIG. 11.

In S110, the access controller 32 determines whether it has received the API access request from the SW-C. When it has received the API access request, the process shifts to S120. When the access controller 32 has not received the API access request, it waits by repeating the same process.

In S120, the access controller 32 determines whether the access in accordance with the API access request is possible using the authorization policy 314 based on the information indicated in the API access request. Specifically, the access controller 32 identifies the application ID using the correspondence table 311 from the process ID indicated in the accepted API access request. The access controller 32 specifies the provision level of SW-C (hereinafter referred to as the request source SW-C) that is the access request source, from the application information 313 associated with the identified application ID. The access controller 32 specifies the request level of the API identified by the API-ID from the API information corresponding to the API-ID indicated in the accepted API access request. Then, the access controller 32 determines whether the request source SW-C can access the access destination API using the authorization policy 314 based on the provision level specified from the process ID and the request level specified from the API-ID. Note that the authorization policy does not necessarily have to be specified for all APIs. When the request destination of the API access request is an API that is not specified in the authorization policy, S140 may be executing without executing S120 and S130.

In the subsequent S130, the access controller 32 determines whether the determination result in S120 permits the access. When the access is permitted, the process shifts to S140. When the access is not permitted, the process shifts to S150.

In S140, the access controller 32 transmits the API access request accepted in S110 to the access destination API and ends the process. For example, the API access request is transmitted to the ECU 4 which performs engine control and brake control by CAN-FD or Ethernet communication via the control system functional block group 25.

In S150, the access controller 32 discards the API access request accepted in S110 and ends the process. At this time, the request source SW-C may be notified that access has been denied.

4. Use Case

4-1. First Case

Figure 5:
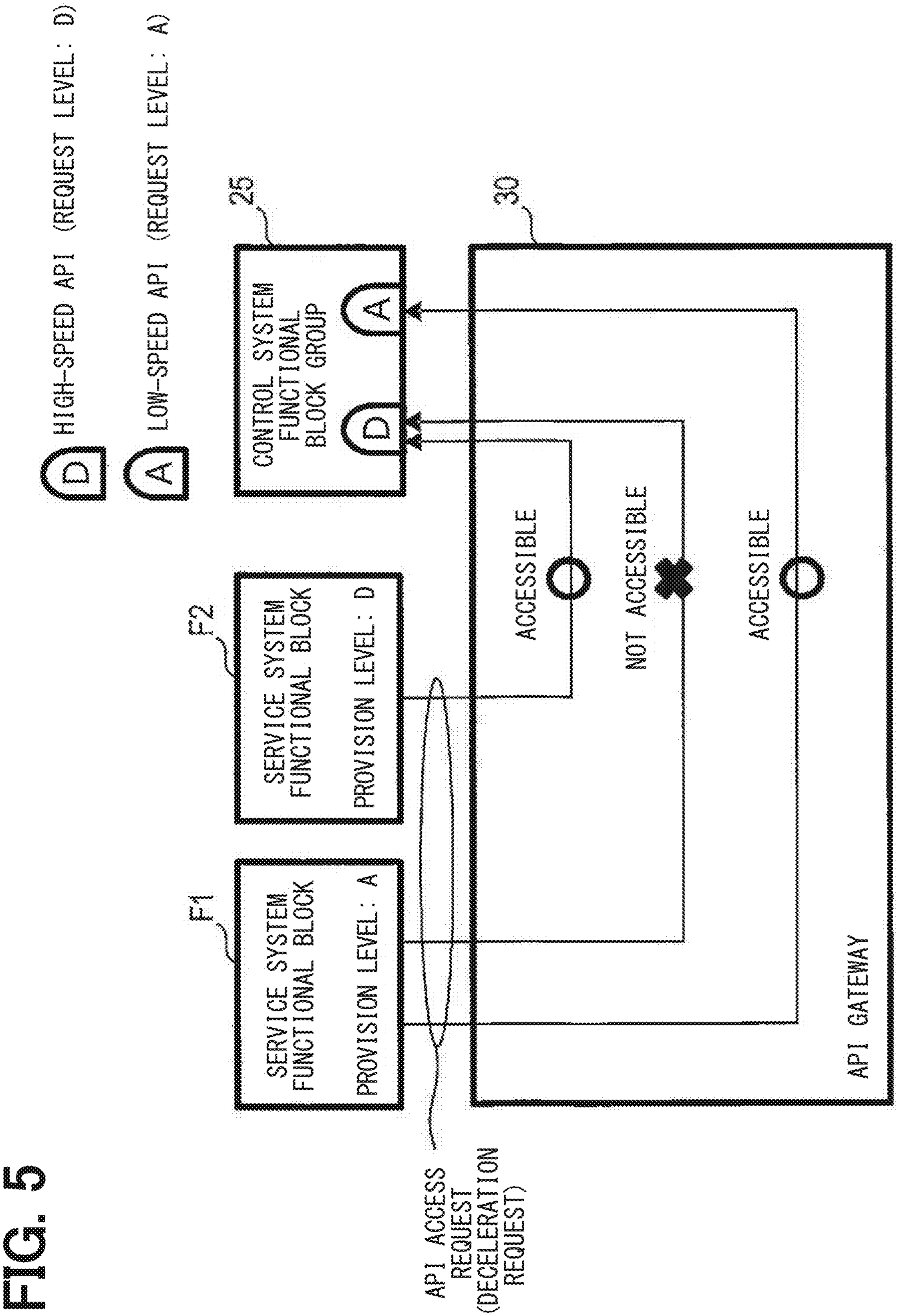
FIG. 5 is an explanatory diagram illustrating API access control by an API gateway.

As shown in FIG. 5, a case where a functional block F1 and a functional block F2 are mounted will be described. The functional block F1 is a service system functional block that implements a collision safety function. The functional block F2 is a service system functional block that implements a collision damage reduction function during low-speed traveling. However, it is assumed that the functional blocks F1 and F2 are implemented by one SW-C respectively.

The functional block F1 executes the process to decelerate when an obstacle is detected ahead during traveling at, for example, a speed of 80 km/h or less. The provision level of the functional block F1 is set to the highest level, D, because when performing deceleration due to malfunction caused by failure during traveling at a speed of 80 km/h, life is at risk to the occupant.

The functional block F2 performs deceleration when the obstacle is detected in the front and rear directions at a speed of, for example, 15 km/h or less. When the functional block F2 performs deacceleration due to a malfunction caused by a failure during traveling at 15 km/h, the provision level is set to B because the occupant is slightly and moderately impaired.

The control system functional block group 25 provides acceleration/deceleration APIs to control the accelerator and brakes in response to acceleration/deceleration requests from the functional blocks F1, F2. The request level of deceleration API (hereinafter referred to as high speed API) used in the high vehicle speed range is set to D. The request level of deceleration API (low speed API) used in the low vehicle speed range is set to B. The high vehicle speed range is set to, for example, $15\text{ km/h}<V\hat{g}\leq 80\text{ km}$, and the low vehicle speed range is set to, for example, $V\geq 15$ km/h.

In this case, the image representing the results of determining the accessibility from each functional block F1 and F2 to each API (i.e., high-speed API and low-speed API) provided by the control system functional block group 25 according to the authorization policy 314 is shown in FIG. 6.

In other words, access from the functional block F1 whose provision level is D to the high-speed range API whose request level is D is permitted. The access to the high-speed range API whose request level is D is denied from the functional block F2, whose provision level is B. The access request to the low-speed range API whose request level is B is permitted from the functional block F2 whose provision level is B.

For example, when a service system functional block with no safety level set (i.e., a provision level of QM) is implemented, all access requests from this service system functional block to the APIs of the control system functional block group 25, which have a safety level set (i.e., a request level of A to D), will be denied.

4-2. Second Case

Figure 7:
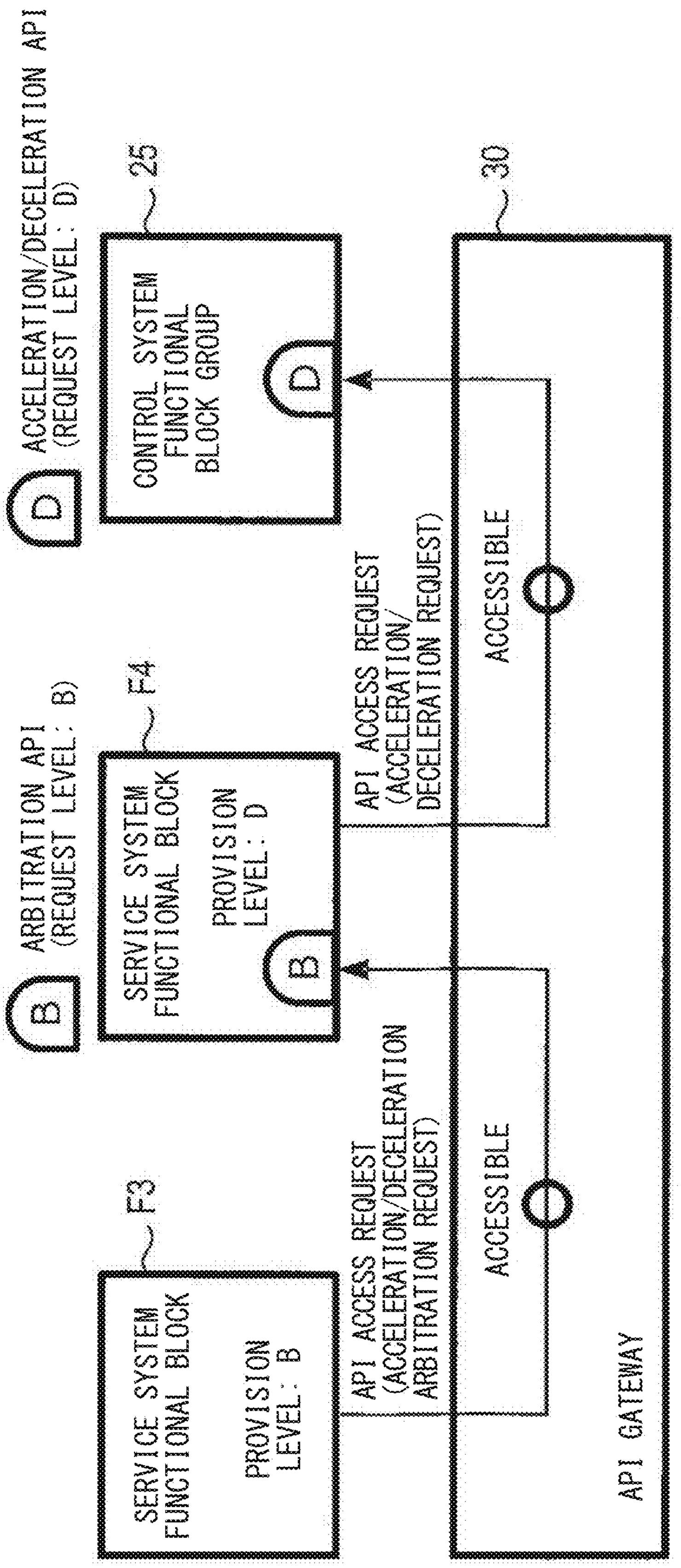
FIG. 7 is an explanatory diagram illustrating API access control by an API gateway.

As shown in FIG. 7, a case where a functional block F3 and a functional block F4 are mounted will be described. The functional block F3 is a service system functional block that implements adaptive cruise control (hereinafter referred to as AC) using AI. The functional block F4 is a service system functional block that implements an acceleration/deceleration arbitration function and a collision safety function in an advanced driver assistance system (hereinafter referred to as ADAS). However, the functional blocks F3 and F4 are implemented by one SW-C respectively.

The functional block F3 determines the vehicle situation by the AI and executes processes to implement acceleration/deceleration control close to the human operating sense. The functional block F3 is designed so that the upper limit of requested acceleration/deceleration is less than the first threshold. In the functional block F3, the provision level is set to B because minor and moderate injuries are caused to the occupants when insufficient deceleration or inactivity occurs due to failure.

The functional block F4 arbitrates acceleration/deceleration required by the ADAS function and requests acceleration/deceleration after arbitration from the control system functional block group 12. In addition, the functional block F4 executes processes to reduce the impact of the collision by the functional block F4 when there is a risk of the collision of the front vehicle when there is insufficient request for deceleration of the ADAS function or no request for deceleration. The functional block F4 is designed so that the upper limit of requested acceleration/deceleration is equal to or greater than the second threshold. The second threshold is set to be greater than the first threshold. In the functional block F4, when insufficient deceleration due to failure or inactivity of the functional block F4 occurs, the provision level is set to D because life is at risk to the occupant.

The functional block F4 is equipped with an arbitration API for accepting acceleration/deceleration requests requested by the functional block F3. The request level of arbitration API is set at B.

The control system functional block group 25 provides acceleration/deceleration APIs to control the accelerator and brakes in response to acceleration/deceleration requests from the service system functional block group 23.

The acceleration/deceleration API is used in all vehicle speed ranges from low speed to high speed, so the request level is set to D.

In this case, the functional block F3 requests access to the arbitration API held by the functional block F4 from the API gateway 30. The API gateway 30 determines whether access is granted or denied in accordance with the authorization policy. Here, since both the provision level and the request level are B, the API gateway 30 determines that the access is allowed and transmits the API access request from the functional block F3 to the arbitration API of the functional block F4.

After arbitrating the acceleration/deceleration request accepted by the arbitration API, the functional block F4 requests the API gateway 30 to access the acceleration/deceleration API provided by the control system functional block group 25. The API gateway 30 determines whether access is permitted or denied in accordance with the authorization policy. Here, since both the provision level and the request level are D, the API gateway 30 determines that the access is permitted, and transmits the API access request from the functional block F4 to the acceleration/deceleration API of the control system functional block group 25.

5. Implementation Mode

A software architecture that shows a method of functionally dividing a service application composed of multiple microservices and assigning them to multiple SW-Cs (i.e., service system functional blocks) will be described.

The service application is implemented by four microservices of "ACC," "collision safety," "acceleration/deceleration arbitration", and "acceleration/deceleration API."

The ACC uses AI to determine the vehicle situation and executes a process that achieves auto cruise control with acceleration/deceleration similar to a human operation sense of control. The provision level is set to B. The "collision safety" executes a process of decelerating when a potential collision obstacle is detected. The "acceleration/deceleration arbitration" executes the process of arbitrating acceleration/deceleration requests required by "ACC" and "collision safety" respectively. The "acceleration/deceleration API" executes the process of generating an API access request to access the acceleration/deceleration API provided by the control system functional block group 12.

The provision level of "ACC" is set to B, and that of "collision safety" and "acceleration/deceleration arbitration" are set to be D. The "acceleration/deceleration API" is not the safety-related process.

5-1. Functional Division by Application

The method of functionally dividing a service application so that the functions as ACC and the functions as collision safety operate independently by separating processes will be described.

Figure 8:
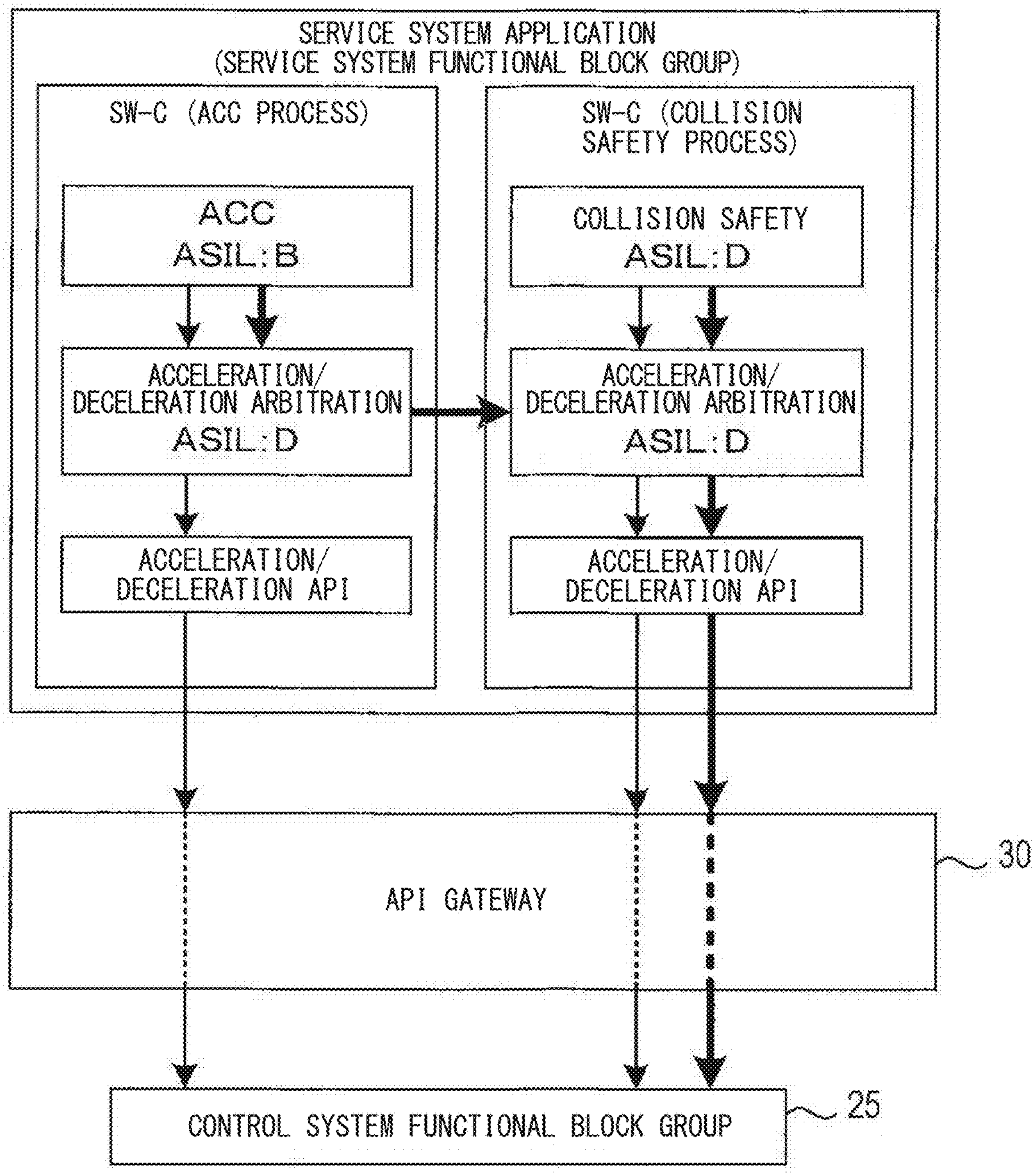
FIG. 8 is an explanatory diagram showing a method for functionally dividing a service application composed of multiple microservices into multiple SW-Cs for independent operation for each application, and the process flow in that case.

As shown in FIG. 8, multiple software "ACC", "acceleration/deceleration arbitration" and "acceleration/deceleration API" are implemented in one SW-C (hereinafter referred to as ACC process) called AC application. In addition, multiple software "collision safety", "acceleration/deceleration arbitration" and "acceleration/deceleration API" are implemented in one SW-C (hereinafter referred to as collision safety Process), which is another collision safety application. Both the ACC process and the collision safety process have the process provision level set at D to match the highest provision level of microservices included in their processes.

In this case, both the ACC process and the collision safety process can operate independently, as shown in the process flow indicated by fine lines with arrows in FIG. 8. In addition, the ACC process and the collision safety process can each access the acceleration/deceleration API provided by the control system functional block group 25 via the API gateway 30.

However, when the ACC process and the collision safety process are operated simultaneously, a function for coordination among the microservices of "acceleration/deceleration arbitration" present in the two processes is required addition, based on the arbitration result, it is necessary to configure the API access request to the control system functional block group 25 to be made from one of the processes (for example, a collision safety process). The process flow in this case is shown by bold lines with arrows in FIG. 8.

This division method makes it difficult to guarantee the provision level of the entire ACC process when the ACC process contains a mix of microservices with different provision levels. In addition, this division method requires a separate mechanism to coordinate among "acceleration/deceleration arbitration', which complicates its composition.

5-2. Function Division by Provision Level

The method of functionally dividing a service application by focusing on the provision levels of microservices (i.e., process division) will be described.

Figure 9:
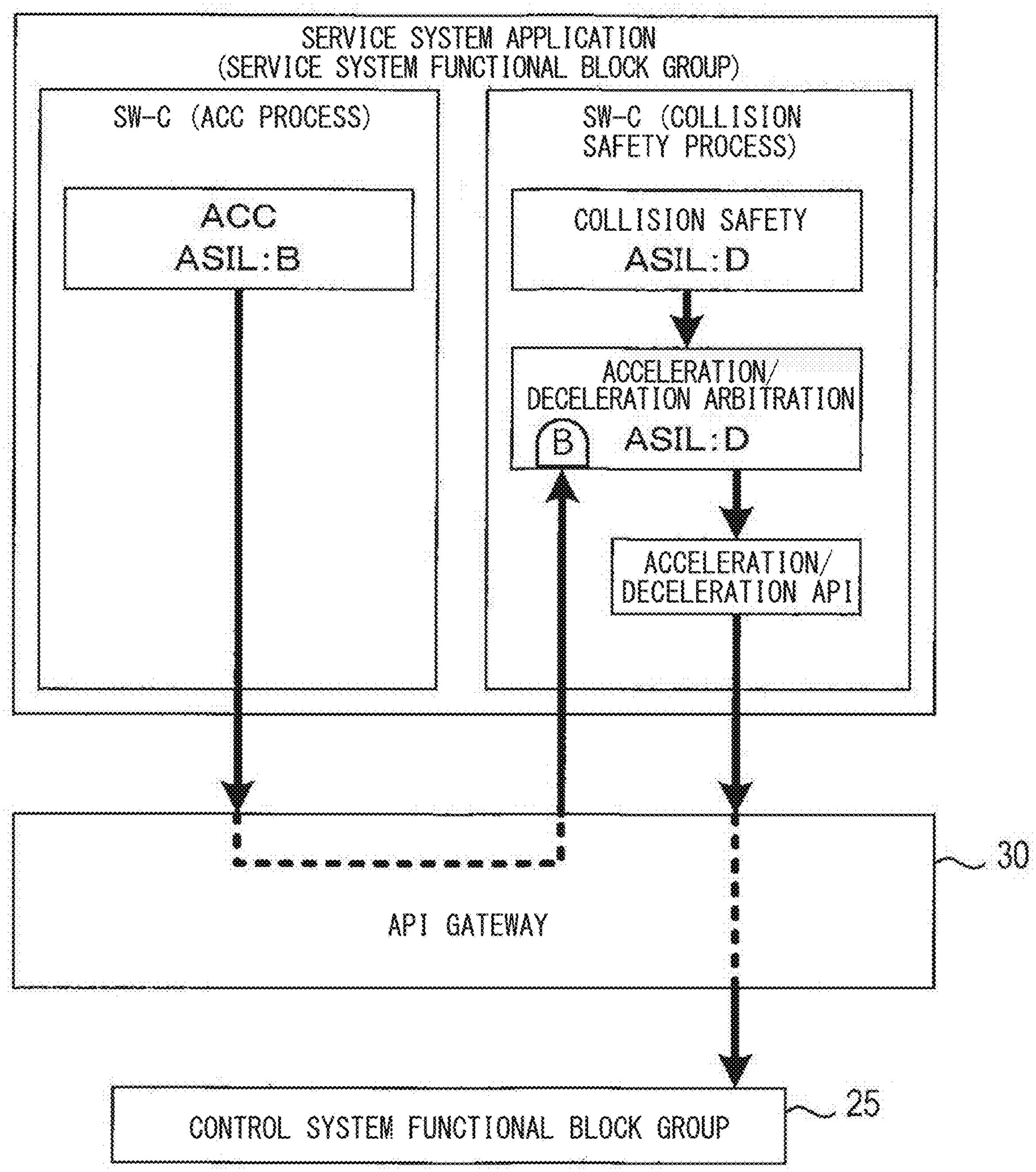
FIG. 9 is an explanatory diagram showing a method for functionally dividing a service application composed of multiple microservices into multiple SW-Cs according to safety levels, and the process flow in that case.

As shown in FIG. 9, the software "ACS" whose provision level is B is implemented by one SW-C (hereinafter referred to as an ACC process), and each software "collision safety" and "acceleration/deceleration arbitration" whose provision level is D is implemented by another SW-C (hereinafter referred to as a collision safety process). The "acceleration/deceleration API" is included in the collision safety process as it will be handled after the "acceleration/deceleration arbitration" process. By dividing the function and dividing the process in this way, the provision level of the ACC process can be set to B and the provision level of the collision safety process can be set to D.

The collision safety process is necessary to be equipped with API (i.e. arbitration API) to provide the function of "acceleration/deceleration arbitration" for other processes. The request level of arbitration API is set to B in line with the provision level of "ACC."

In this case, as shown by bold lines with arrows in FIG. 9, an access request from the ACC process to access the arbitration API provided by the collision safety process is executed through the API gateway 30. In addition, an access request from the collision safety process to access the acceleration/deceleration API provided by the control system functional block group 25 is executed through the API gateway 30.

In this division method, each process is functionally divided so that microservices of the same provision level are included in the same process, and microservices of different provision levels are not mixed in one process. Therefore, it is easier to guarantee the provision level of each process. The collision safety processes, including "acceleration/deceleration arbitration", require arbitration API, which complicates the configuration of the collision safety process.

This division method corresponds to the use case shown in FIG. 7.

5-3. Functional Division by Microservice

The method of functionally dividing a service application by microservice will be described.

Figure 10:
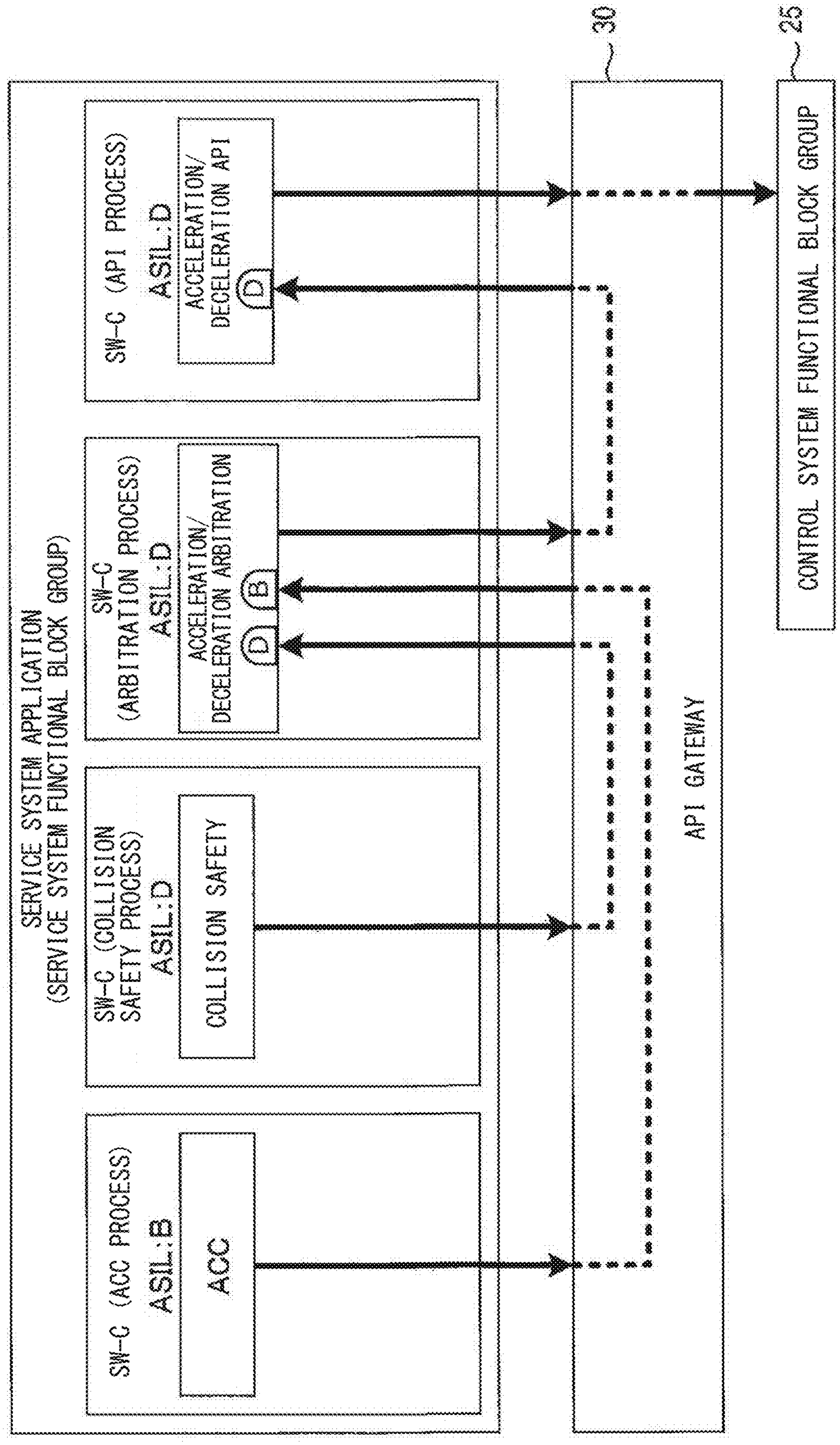
FIG. 10 is an explanatory diagram showing a method for functionally dividing a service application composed of multiple microservices into multiple SW-Cs for each microservice, and the process flow in that case.

As shown in FIG. 10, one SW-C (hereinafter referred to as the ACC process) is assigned to the software "ACC". Another SW-C (hereinafter referred to as collision safety process) is assigned to the software of "collision safety". Another SW-C (hereinafter referred to as the arbitration process) is assigned to the software of "acceleration/deceleration arbitration". Another SW-C (hereinafter referred to as "API process") is assigned to the software of "acceleration/deceleration API".

By dividing the function and dividing the process in this way, the provision level of the ACC process can be set to B and the provision level of the collision safety process and the arbitration process can be set to D. Incidentally, the provision level of the API process is set to D in accordance with the request level of acceleration/deceleration API provided by the control system functional block group 25.

The arbitration process has API (i.e. arbitration API) to provide the function of "acceleration/deceleration arbitration" for the ACC process and collision safety process. The API process has an API (hereinafter, request generation API) to provide the function of "acceleration/deceleration API" for the arbitration process. The request level of arbitration API for accepting requests from the ACC process is set to B in line with the provision level of the ACC process, and the request level of arbitration API for accepting requests from the collision safety process is set to D. The request level of the request generation API is conveniently set to D in line with the provision level of the arbitration process.

In this case, as indicated by bold lines with arrows in FIG. 10, requests for access from the ACC process and the collision safety process to the arbitration process are executed through the API gateway 30. In addition, a request to access the API process from the arbitration process is executed through the API gateway 30. Further, a request for access to the control system functional block group 25 from the API process is executed through the API gateway 30.

In this division method, each process is functionally divided so that individual microservices are included in separate processes, and microservices with different provision levels are not mixed in one process. Therefore, it becomes easier to guarantee the provision level of each process. In addition, although the structure of each process is simple, the communication volume between processes through the API gateway 30 increases.

6. Correspondence of Terms

The API gateway 30 in the above embodiment corresponds to an access control device and a coordination controller in the present disclosure. The vehicle interior communication network 6 corresponds to an in-vehicle network in the present disclosure. The SW-C comprising the service system functional block group 23, the control system functional block group 25, and the data system functional block group 26 corresponds to a functional block in the present disclosure. The API corresponds to a functional interface in the present disclosure. The information storage 31 storing the authorization policy 314 corresponds to a policy storage in the present disclosure. The microservices correspond to a micro functional block in the present disclosure.

7. Effects

According to the above-described embodiment, the following effects are achieved.

(1) The API gateway 30 permits access to the API to be accessed by the SW-C from which the API access request is made when the provision level, which is the safety level guaranteed by the SW-C, satisfies the request level, which is the safety level required by the API. In other words, only the API access request from SW-C that meets the request level of API is transmitted to the API which is the access destination. Accordingly, it is possible to prevent unexpected operation control by freely using API that provides safety-related functions by service system functional blocks and the like for which the safety levels are not provided. In addition, since the functions provided by API do not need to include processes to deal with requests from SW-C that do not meet the request level, it is possible to simplify the processes.

(2) When a service application including multiple microservices is implemented by multiple SW-Cs, paying attention to the level of microservice provision, the function is divided so that microservices of the same provision level are included in the same SW-C (i.e., process). When such a function division is performed, it is possible to achieve both a reduction in processing load and an improvement in development efficiency.

8. Other Embodiments

Although the embodiment of the present disclosure has been described above, the present disclosure is not limited to the embodiment described above, and various modifications can be made to implement the present disclosure.

(a) In the present disclosure, the access to safety system API is restricted. However, the SW-C, which is the request source of the API access request, is fixed. The API, for which the other SW-C has no possibility of becoming the request source, may be excluded from the access restriction target of the API gateway 30 even in a case of the safety system API.

(b) In the present disclosure, the authorization policy is expressed by the matrix representing all combinations of provision levels and request levels. However, as shown in the authorization policy image in FIG. 6, it may be expressed by a matrix representing combinations of application IDs and APIs. In this case, based on the information indicated in the API access request, it is possible to determine whether access is permitted more simply.

(c) In the present disclosure, the ECU 2 includes both a real-time processing unit 10 and an application processing unit 20, but it may include only one of them.

(d) In the present disclosure, although the ECU 2 is equipped with a service system functional block group 23, a control system functional block group 25, and a data system functional block group 26, other in-vehicle devices 3 to 5 may be equipped with at least a portion of the functional block groups 23 to 26. In addition, the functional block groups 23 to 26 may be centrally arranged in any one of the in-vehicle devices 2 to 5, or may be distributed in a plurality of in-vehicle devices 2 to 5.

(e) The in-vehicle devices 2 to 5 and the methods according to the present disclosure may be achieved by a dedicated computer provided by constituting a processor and a memory programmed to execute one or more functions embodied by a computer program. Alternatively, the in-vehicle devices 2 to 5 and the methods according to the present disclosure may be achieved by a dedicated computer provided by constituting a processor with one or more dedicated hardware logic circuits. Alternatively, the ECUs and the like and the methods described in the present disclosure may be achieved by one or more dedicated computers configured by combinations of processors and memories programmed to perform one or more functions and processors configured by one or more hardware logic circuits. The computer program may be stored in a computer-readable non-transitory tangible storage medium as instructions to be executed by a computer.

(f) A plurality of functions of one component in the above embodiment may be achieved by a plurality of components, or a function of one component may be achieved by the plurality of components. A plurality of functions belonging to a plurality of components may be achieved by one component, or one function achieved by a plurality of components may be achieved by one component. Part of the configuration of the above embodiment may be omitted. At least a part of the configuration in one embodiment may be added to or substituted for the configuration of another embodiment.

(g) In addition to the vehicle control system and access control device described above, the present disclosure can be implemented in various forms, such as a program for causing a computer to function as the access control device, a non-transitory tangible storage medium such as a semiconductor memory in which this program is stored, and an access control method.

What is claimed is:

1. A vehicle control system comprising:

a plurality of electronic control units that are mounted in a vehicle and connected to an in-vehicle network;

a plurality of functional blocks each configured to execute a predetermined process, the plurality of functional blocks including a service system functional block and a control system functional block, the control system functional block being configured to provide a function for controlling motion of the vehicle in response to a request from the service system functional block; and a coordination controller configured to implement coordination between the service system functional block and the control system functional block;

wherein:

the control system functional block includes a functional interface configured to provide an own function to the service system functional block;

the coordination controller includes:

a policy storage configured to store an authorization policy indicating a rule for authorizing access of an access request from the service system functional block to the functional interface; and an access controller configured to:

upon receiving the access request from the service system functional block, extract a provision level from the service system functional block and extract a request level from the control system functional block;

upon receiving the access request from the service system functional block, determine whether to authorize access from a request source block to a request destination interface by comparing the extracted provision level and the extracted request level in accordance with the authorization policy; and transmit the access request to the request destination interface when the access is authorized;

the authorization policy is set using the provision level and the request level;

the provision level is set in the service system functional block, and the request level is set in the control system functional block;

the provision level is a safety level indicating safety of the function of the service system functional block; and the request level is the safety level requested by the request destination interface serving as a request destination of the access request to the request source block serving as a request source of the access request.

2. The vehicle control system according to claim 1, wherein the authorization policy is set to authorize access when the provision level is equal to or higher than the request level and deny the access when the provision level is lower than the request level.

3. The vehicle control system according to claim 1, wherein an automotive safety integrity level is used as the safety level.

4. The vehicle control system according to claim 1, wherein the plurality of functional blocks include at least one micro functional block, and the provision level of the plurality of functional blocks is configured to achieve a highest level among the safety level requested for each of the at least one micro functional block.

5. The vehicle control system according to claim 1, comprising a correspondence table indicating the provision level of the request source block and the request level of the request destination interface, and the access controller is configured to refer to the correspondence table according to the request source block and the request destination interface extracted from the access request to extract the provision level of the request source block and the request level of the request destination interface, and determine whether to authorize access from the request source block to the request destination interface using the authorization policy from the extracted provision level and the extracted request level.

6. The vehicle control system according to claim 1, comprising a correspondence table indicating the provision level of the request source block and the request level of the request destination interface, and whether to permit access for all combinations of the request source block and the request destination interface according to the authorization policy, wherein the access controller is configured to determine whether to authorize access from the request source block to the request destination interface by referring to the correspondence table according to the request source block and the request destination interface extracted from the access request.

7. The vehicle control system according to claim 5, wherein the plurality of functional blocks and the functional interface are identified by a process ID provided by an operating system at activation of the vehicle control system, and the correspondence table is generated by the operating system after the process ID is provided, and is configured to identify the request source block and the request destination interface by the process ID.

8. An access control device comprising:

a plurality of functional blocks each configured to execute a predetermined process, the plurality of functional blocks including a service system functional block and a control system functional block, the control system functional block being configured to provide a function for controlling motion of a vehicle in response to a request from the service system functional block; and a coordination controller configured to implement coordination between the service system functional block and the control system functional block;

wherein:

the control system functional block includes a functional interface configured to provide an own function to the service system functional block;

the coordination controller includes:

a policy storage configured to store an authorization policy indicating a rule for authorizing access of an access request from the service system functional block to the functional interface; and an access controller configured to:

upon receiving the access request from the service system functional block, extract a provision level from the service system functional block and extract a request level from the control system functional block;

upon receiving the access request from the service system functional block, determine whether to authorize access from a request source block to a request destination interface by comparing the extracted provision level and the extracted request level in accordance with the authorization policy; and transmit the access request to the request destination interface when the access is authorized;

the authorization policy is set using the provision level and the request level;

the provision level is set in the service system functional block, and the request level is set in the control system functional block;

the provision level is a safety level indicating safety of the function of the service system functional block; and the request level is the safety level requested by the request destination interface serving as a request destination of the access request to the request source block serving as a request source of the access request.

9. An access control method comprising:

extracting a provision level from a service system functional block and extracting a request level from a control system functional block in response to receiving an access request from the service system functional block;

determining whether to authorize access from a request source block to a request destination interface by comparing the extracted provision level and the extracted request level, in accordance with an authorization policy, in response to receiving the access request from the service system functional block; and transmitting the access request to the request destination interface when the access is authorized;

wherein:

the control system functional block is configured to provide a function for controlling motion of a vehicle in response to a request from the service system functional block;

the control system functional block includes a functional interface for providing an own function to the service system functional block;

the authorization policy is set using the provision level and the request level;

the provision level is set in the service system functional block, and the request level is set in the control system functional block;

the provision level is a safety level indicating safety of the function of the service system functional block; and the request level is the safety level requested by the request destination interface serving as a request destination of the access request to the request source block serving as a request source of the access request.

* * * * *